United States Patent
Connor

(10) Patent No.: US 6,785,751 B1
(45) Date of Patent: Aug. 31, 2004

(54) METHOD AND APPARATUS FOR MINIMIZING BUS CONTENTION FOR I/O CONTROLLER WRITE OPERATIONS

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 09/663,959

(22) Filed: Sep. 19, 2000

(51) Int. Cl.$^7$ ................................................. G06F 3/00
(52) U.S. Cl. ...................... 710/52; 710/5; 710/22; 710/33; 710/35; 710/36; 710/56; 710/57
(58) Field of Search ............................... 710/5, 36, 52, 710/33, 56, 27, 22, 35

(56) References Cited

U.S. PATENT DOCUMENTS

| | | | | |
|---|---|---|---|---|
| 5,640,604 A | * | 6/1997 | Hirano | 710/56 |
| 5,732,286 A | * | 3/1998 | Leger | 710/57 |
| 5,828,835 A | * | 10/1998 | Isfeld et al. | 709/200 |
| 5,894,560 A | * | 4/1999 | Carmichael et al. | 710/25 |
| 6,021,462 A | * | 2/2000 | Minow et al. | 711/114 |
| 6,138,176 A | * | 10/2000 | McDonald et al. | 710/6 |
| 6,161,154 A | * | 12/2000 | Schultz et al. | 710/56 |
| 6,230,191 B1 | * | 5/2001 | Walker | 709/213 |
| 6,345,329 B1 | * | 2/2002 | Baskey et al. | 710/56 |
| 6,421,756 B1 | * | 7/2002 | Kelley et al. | 710/310 |
| 6,483,804 B1 | * | 11/2002 | Muller et al. | 370/230 |

* cited by examiner

Primary Examiner—Jeffrey Gaffin
Assistant Examiner—Niketa Patel
(74) Attorney, Agent, or Firm—Blakely, Sokoloff, Taylor & Zafman LLP

(57) ABSTRACT

Inform writes to inform a controller of availability of a plurality of replacement data buffers are optimally batched as a single message. Batching the inform writes lets the controller maintain control of a bus, thereby letting the controller continue with input operations with less interruption, while still allowing for timely replenishment of data buffers that can be made available to the controller. The number of available data buffers to indicate in the single message can be chosen so that the controller need not be starved of data buffers while waiting for a threshold number of available data buffers to be reached.

25 Claims, 3 Drawing Sheets

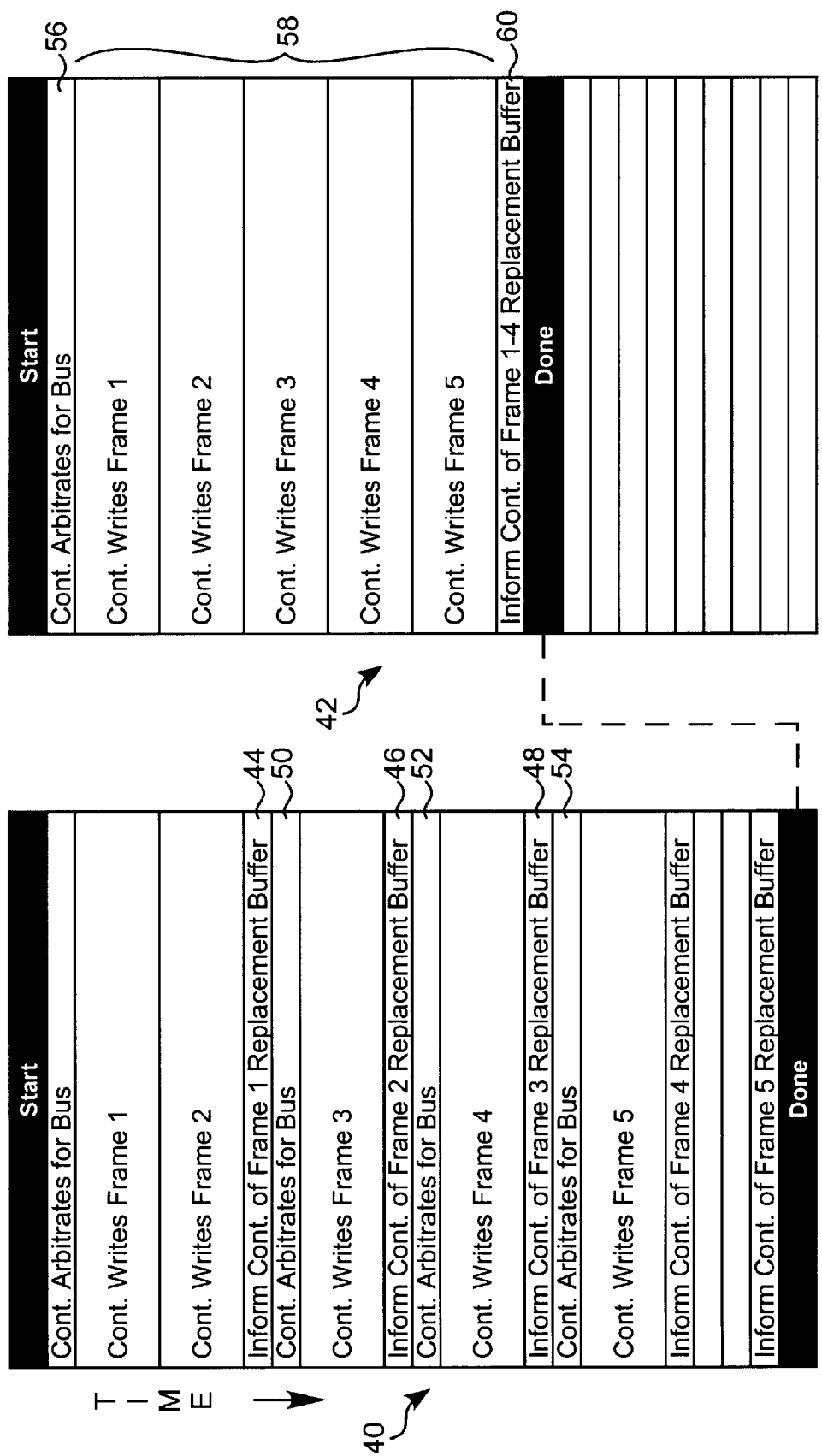

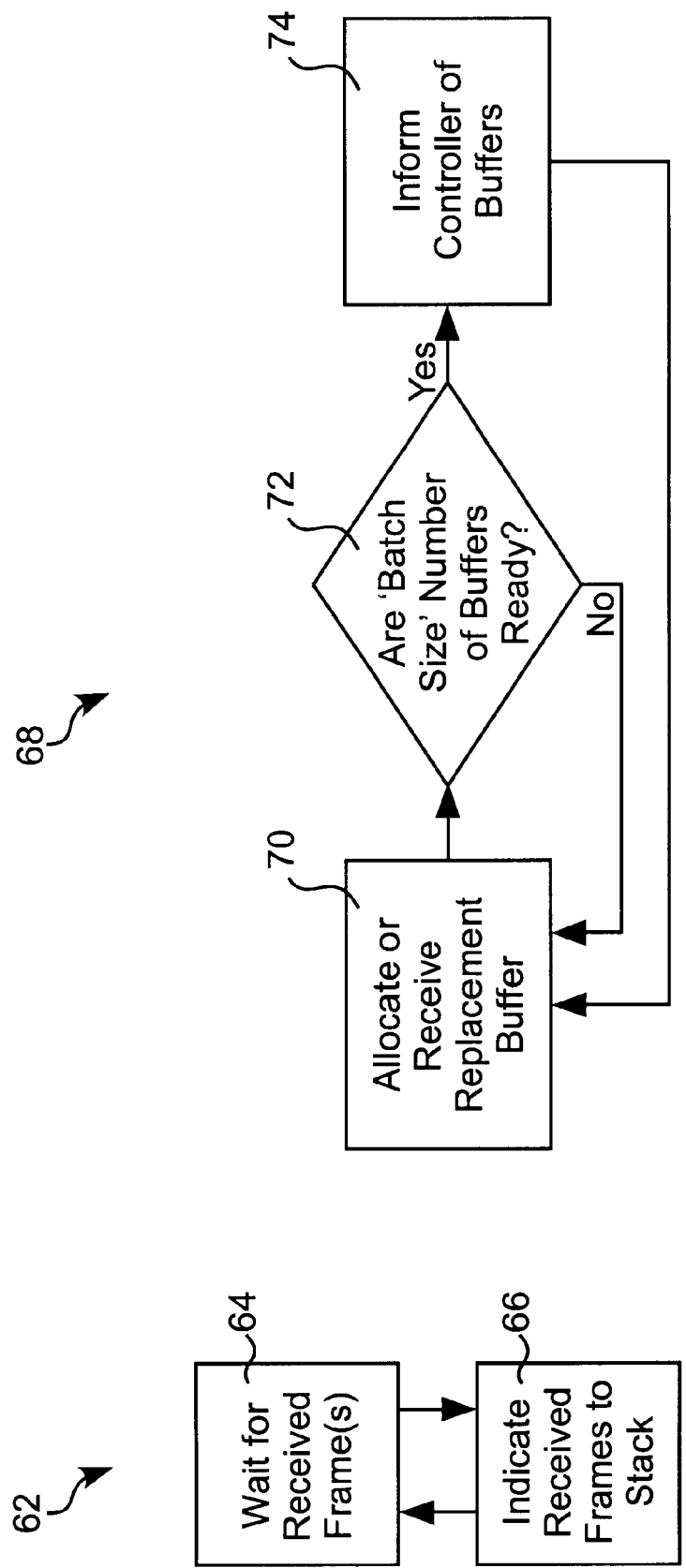

METHOD AND APPARATUS FOR MINIMIZING BUS CONTENTION FOR I/O CONTROLLER WRITE OPERATIONS

BACKGROUND OF THE INVENTION

1. Field of the Invention

The present invention relates generally to data transfers in systems, and in particular, relates to improving data transfer and bus efficiency by minimizing bus contention when a device writes data to memory.

2. Background Information

In computer systems, components are coupled to each other via one or more busses. A variety of components can be coupled to the bus, thereby providing intercommunication between all of the various components/devices. An example of a bus that is used for data transfer with a processor or for data transfer between a memory and another device is the peripheral component interconnect (PCI) bus.

In order to relieve a processor of the burden of controlling the movement of blocks of data inside of a computer, direct memory access (DMA) transfers are commonly used. With DMA transfers, data can be transferred from one memory location to another memory location, or from a memory location to an input/output (I/O) device (and vice versa), without having to go through the processor. Additional bus efficiency is achieved by allowing some of the devices connected to the PCI bus to be DMA masters.

When transferring data using DMA methods, scatter gather descriptors are often used. High performance I/O controllers, such as gigabit Ethernet media access control (MAC) network controllers, are typically scatter gather descriptor-based bus-mastering devices that allow a computer to communicate with a network. The scatter gather descriptors are used to provide address and control information about data buffers (or "scatter gather elements") in memory that the controller needs to read or write for I/O operations. For example, the descriptors provide information such as the memory location from where bytes of data are to be moved, the address to where the bytes should go, the number of bytes to move, etc.

To write data into data buffers of a memory using DMA transfers, such as when incoming data received by the controller is to be written into memory, the controller needs to be informed of available data buffer locations in memory, so that the controller can send the data to these locations. A driver for the controller generally uses scatter gather descriptors to inform the controller of these available data buffer locations. The driver first allocates data buffers in memory and inserts information into descriptors that point at these available data buffers. Next, the driver writes to a command register of the controller to inform the controller that the descriptor(s) are ready to be processed/read. The controller then DMA transfers the descriptor(s) from memory to a first-in-first-out (FIFO) buffer, for example, so that the controller can obtain the data buffer's information (e.g., identify the data buffer's memory location, length, etc.). After the controller has processed the descriptor(s) to obtain this information, the controller knows the locations of available data buffers in memory and can DMA transfer the received contents/data (e.g., frames) to the data buffer(s) referred to by the descriptor(s).

As the controller receives more incoming data, the controller needs more bus bandwidth and consumes more data buffers. Therefore, after data in data buffers is processed, such data buffers are overwritten with new data. In other words, the data buffers are repeatedly "replenished" so that they can be used by the controller.

The driver needs to inform the controller of these replenished or "replacement" data buffers to prevent overruns. That is, the driver generally informs the controller that more data buffer(s) are ready by writing to a command register of the controller. These writes to the command register are typically slave accesses to the controller performed by a bus bridge. In order for the bus bridge to perform these writes, the bus bridge removes control of the bus from the controller. In cases where the controller is under heavy load (e.g., receiving a large number of frames), losing control of the bus can cause overruns. Overruns occur if data continues to come to the controller (e.g., from the network) and the controller cannot move the data to system memory with sufficient speed, thereby causing on-chip buffers in the controller to fill beyond capacity. This can result in lost data.

Therefore, it is evident that when high-speed performance by a controller is desired, multiple problems occur. As data throughput increases, available data buffers are consumed more quickly. These data buffers must be replenished, but the act of replacing them, including the act of informing the controller of the availability of these data buffers, can reduce bus bandwidth to the controller when the controller needs the bus bandwidth the most.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

FIG. 2 illustrates a known method of writing data by a network controller.

FIG. 3 illustrates a method of writing data that can be used by the system of FIG. 1 according to an embodiment of the invention.

FIG. 4 is a flowchart illustrating operation of a driver that can be implemented for the method of FIG. 3 according to an embodiment of the invention.

FIG. 5 is a flowchart further illustrating operation of a driver that can be implemented for the method of FIG. 3 according to an embodiment of the invention.

DETAILED DESCRIPTION OF THE ILLUSTRATED EMBODIMENTS

Figure 1:
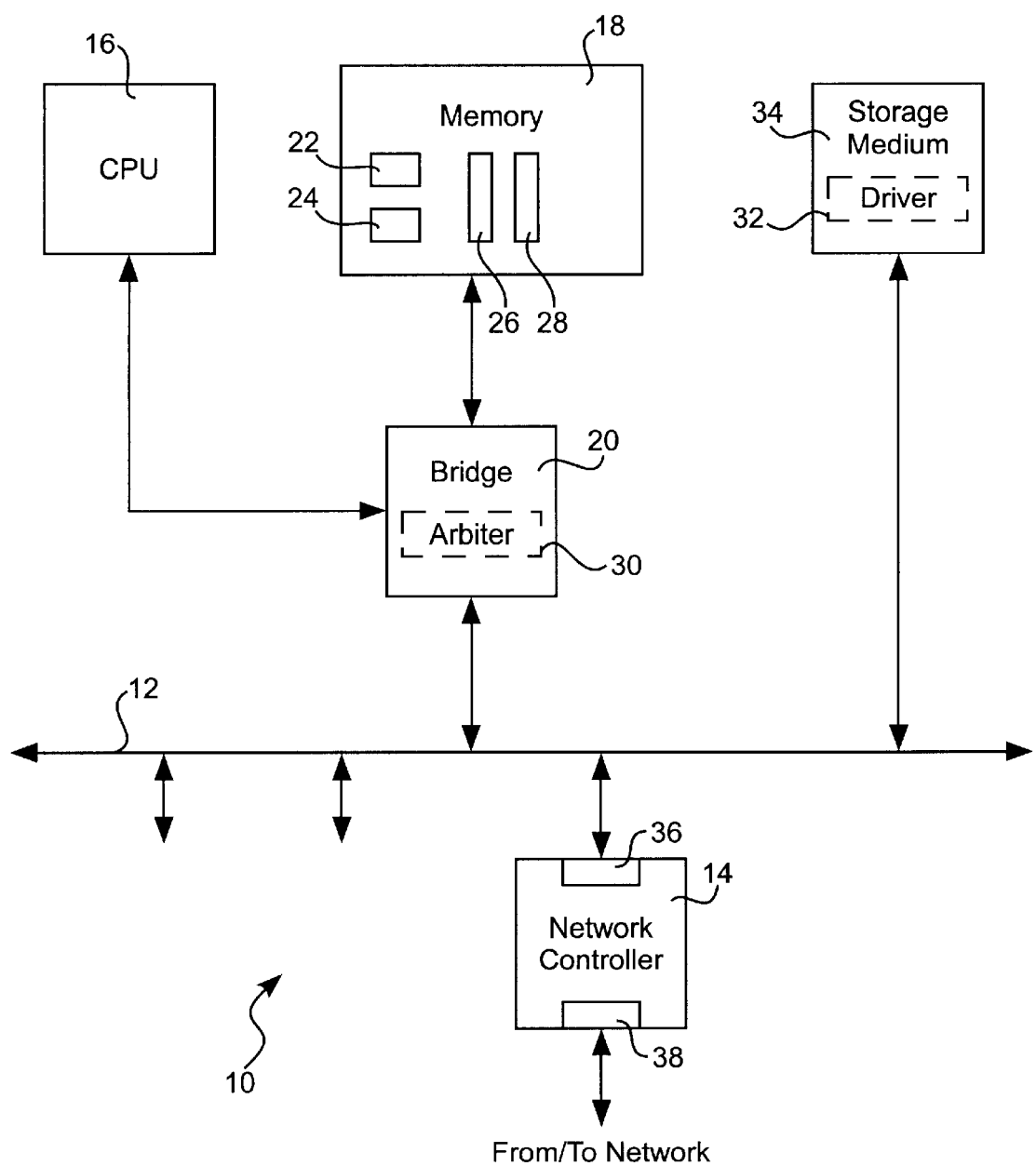
FIG. 1 is a block diagram of a system that can implement an embodiment of the invention.

Embodiments of a method and apparatus to minimize bus contention when a device, such as a network controller, writes data to memory are described in detail herein. In the following description, numerous specific details are provided, such as the description of computer system components in FIG. 1, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a driver for a device, such as a network controller or I/O controller, which selectively or collectively informs the controller when data buffers in memory are available for write (e.g., input) operations. This is done using what is hereinafter referred to as an "inform write" by the driver to a command register of the controller. Sequences or sets of data, such as frames or packets received by the controller, are written to memory using DMA transferring methods via a bus, although other types of data transfer/writing methods besides DMA methods may be used.

However, rather than making an inform write to the controller after each replacement data buffer becomes available, the driver batches a plurality of inform writes together that inform the controller of the availability of a plurality of replacement buffers. By moderating or lessening the number of inform writes to the controller, control of the bus is removed from the controller less often. As will be evident below, an embodiment of the invention that sends inform writes in this manner allows input/write operations to continue with less interruption and still allows for timely replacement of data buffers.

Referring first to FIG. 1, shown generally at 10 is a system, such as a computer system, that can implement an embodiment of the invention. The system 10 can comprise a personal computer (PC), laptop computer, network switch, router, wireless device, or the like having the capability to connect to a network (not shown). The system 10 includes a bus 12, which can be a PCI bus, for example. It is to be appreciated that other types of busses, such as a universal serial bus (USB) or InfiniBand, may also be used.

Several devices may be directly or indirectly coupled to the bus 12. For instance, an I/O controller or network controller 14 is coupled to the bus 12 and allows the system 10 to send/receive network data, typically in the form of packets or frames. In one embodiment, the network controller 14 (sometimes referred to as an "adapter") can comprise an Ethernet MAC controller or network interface card (NIC), and it is understood that other types of network controllers, I/O controllers such as small computer system interface (SCSI) controllers, or cards may be used.

A processor 16, such as a central processing unit (CPU), and a memory 18 can be coupled to the bus 12 via a bridge 20. The memory 18, sometimes referred to as "host memory" or "system memory," comprises random access memory (RAM). The memory 18 can further include a plurality of data buffers 22 and 24 and can store a plurality of descriptors 26 and 28, for example. The descriptors 26 and 28 may or may not be contiguously connected as "descriptor rings." Although FIG. 1 shows the data buffers 22 and 24 and the descriptors 26 and 28 as residing in the memory 18, it is to be appreciated that some or all of these buffers/descriptors may be located in a storage unit separate from locations in the memory 18 in one embodiment.

To provide arbitration for use of the bus 12 (e.g., when reading from or writing to the memory 18), the bridge 20 includes an arbiter 30. A driver 32 controls operation of the network controller 14 and performs other operations related to the writing of frames to the memory 18. The driver 32 is typically embodied in software that is stored in a machine-readable storage medium 34, such as a hard disk drive of the system 10, and is executed by the processor 16. As is known in the art, execution of the software of the driver 32, during normal operation, can include copying this software into the memory 18 and/or into a cache (not shown) of the processor 16, and execution of the software from that location.

In an embodiment of the invention, the driver 32 sends inform writes to a command register 36 of the controller 14 to inform the controller 14 of available data buffers, such as the data buffers 22 and 24, in the memory 18. In operation, frames are received by the controller 14 and held in an on-chip buffer 38. The controller 14 then processes information in the command register 36 and/or in a FIFO buffer (not shown) to determine the location(s) of available data buffers in the memory 18. This processing by the controller may include reading descriptors, such as the descriptors 26 and 28, which the driver 32 has prepared and which have been DMA-transferred from the memory 18 by the controller 14.

After the controller 14 determines the location(s) of available data buffer(s), the controller 14 DMA transfers the received frame(s) from the on-chip buffer 38 to the data buffer(s) provided by the driver 32. The frame(s) comes into the allocated data buffer(s) and is provided to a protocol stack or other unit/component for further processing, and then eventually returned after processing is completed, in a manner known by those skilled in the art. After the frame is returned, the data buffer that held the frame can be used to hold subsequent frame(s). In other words, such data buffers are "replenished" or become available as replacement data buffers that can be overwritten with the data of subsequent frames. These replacement data buffers can be placed in a "pool" of replacement data buffers, placed sequentially in the next available memory location in the memory 18, or otherwise made available in the memory 18 in a manner known by those skilled in the art.

An embodiment of the invention takes advantage of the fact that the controller 14 need not be informed each time a replacement data buffer becomes available. Rather, the controller 14 is selectively informed of the availability of a plurality of replacement data buffers. This selective informing allows a plurality of replacement data buffers, rather than individual replacement data buffers, to be made available to the controller 14. This method of selective informing minimizes when the controller 14 will lose control of the bus 12 when it needs it the most, yet the method still provides needed replacement data buffers.

An embodiment of the invention takes advantage of the fact that the selective informing can be made when the controller 14 is not currently using the bus 12 (and so bus control is not unnecessarily taken away from the controller 14 when doing the selective informing). This is possible because network traffic is often "bursty." The term "bursty" refers to the fact that, in many applications, short periods of high network utilization are often followed by longer periods of low or no network utilization.

An embodiment of the invention that illustrates how the preceding is done and how it compares to a prior art writing operation are shown in FIGS. 2–3. FIGS. 2 and 3 show timeline tables 40 and 42, respectively, indicating the writing or DMA transfer of five frames, with five frames being arbitrarily chosen as an illustrative example. Also for the sake of illustration and explanation in FIGS. 2–3, each frame is shown as using three time units to DMA transfer, with controller arbitration for the bus and inform writes being shown as using one time unit. Furthermore, it is assumed that the protocol stack uses three time units to replace a data buffer. It is understood that three time units are for illustrative purposes.

The timeline table 40 of FIG. 2 represents a prior art method of replenishing frames, which is similar to what is described in the Background section above. At 44, 46, and 48, for example, a driver informs a controller of the availability of data buffers previously used by Frames 1, 2, and 3, respectively. As evident, these inform writes at 44, 46, and 48 are individual inform writes that require removal of control of the bus from the controller, and require the controller to subsequently re-arbitrate for bus control at 50, 52, and 54, respectively. These interruptions of the controller's control of the bus result in undesirable latency.

Furthermore with the timeline table 40, even though the protocol stack is able to provide a replacement data buffer in three time units, the controller is not informed of this available data buffer until at least four time units after the data buffer becomes available. This is because the inform write is delayed while the current frame write is completed. For instance, the inform write at 46, to inform the controller of the availability of a data buffer previously used by Frame 2, has to be done after an inform write at 44 (1 time unit) and the writing of Frame 3 (3 time units).

The timeline table 42 of FIG. 3 illustrates an embodiment of a method that provides significant improvements and advantages over the method shown in FIG. 2. With the method of FIG. 3, the controller 14 arbitrates for control of the bus 12 at 56. Once bus control is attained, the controller 14 writes Frames 1–5 to the memory 14 at 58, without interruption in one embodiment. When the DMA transfer of Frame 5 is completed, the data buffers that were previously used by Frames 1–4 are made available by the protocol stack. As such, the driver 32 can send a single inform write to the controller 14 at 60 to notify the controller 14 that these replacement data buffers are available. In effect, the driver "batches" the frame writes to memory and/or the inform writes associated with each replacement buffer into a single message/inform write at 60.

It is noted that in the example of FIG. 3, an inform write for the availability of the data buffer previously used by Frame 5 is not included (e.g., it is excluded) in the single inform write at 60. This is because in this example, it is assumed that the protocol stack uses three time units to replace a data buffer, and therefore, this data buffer is not yet available at 60. Hence, in one embodiment, the controller 14 is informed of the replacement data buffer of Frame 5 in a subsequent, second single batched message for Frames 5–8 (not shown). The number of "leftovers" like Frame 5's replacement buffer, can be the batch size minus 1, at most, in an embodiment. In most applications, these leftovers are not significant, and can be addressed by watchdog or callback functions if necessary, as would be understood by those skilled in the art having the benefit of this disclosure.

It is clear from FIGS. 2 and 3 that an embodiment of the invention results in a faster completion in the writing of frames to memory. As a further illustration, if the controller 14 can queue 256 scatter gather descriptors and the batch size (e.g., the number of replacement buffers that a single inform write can indicate as being available at 60) is 8, then the batch size is 8/256 or 1/32 of the queue. For PCI applications, this value is sufficiently small to ensure that the controller 14 is not data buffer-starved. In other words, the controller 14 is informed of available data buffers by the time that it needs such data buffers: the controller 14 is not "kept waiting" by the driver 32, while the driver 32 attempts to batch together an impractically large number of replacement data buffers. Hence, in an embodiment of a method according to the invention, the method avoids overruns in the on-chip buffer 38 by making data buffers available to the controller 14 in a timely manner. Also in an embodiment, the driver 32 does not frequently query the controller's 14 status, since such reads to the controller 14 are driven by the bridge 20 and may cause the same problems as frequent slave writes to the controller 14. With a batch size of 8, the number of required inform writes for replacement data buffers is reduced from 8 inform writes to 1 inform write, or a reduction of 87.5%. Thus, batching even a small number of inform writes together can significantly reduce the number of inform writes that occur on the bus 12, and therefore reduce the bus contention caused by inform writes.

Referring next to FIGS. 4 and 5, shown generally at 62 and 68, respectively, are flowcharts illustrating operation of the driver 32 according to an embodiment of the invention. The illustrated operations can be implemented by the method of FIG. 3.

FIGS. 4 and 5 show how data buffers are consumed and replenished, and how the controller 14 is informed of the replenished/replacement data buffers. First, FIG. 4 shows the driver 32 waiting for received frame(s) at 64, and then indicating or sending the received frames to the protocol stack at 66, thereby eventually making the data buffers for these frames available as replacement data buffers.

In FIG. 5, the flowchart 68 shows an embodiment of a method to selectively inform the controller 14 of the availability of replacement data buffers for frames that have been indicated to the protocol stack at 66 of FIG. 4. First at 70, the driver 32 receives or is informed of a replacement data buffer. Next at 72, the driver 32 checks if the batch size of available data buffers has been reached or is ready. If not, then the driver 32 waits for another replacement data buffer at 70. When the batch size has been reached at 72, the driver 32 performs an inform write to the controller 14 at 74, which corresponds to 60 in FIG. 3. The driver 32 also subsequently allocates these available data buffers at 70, so that they are held in reserve for the forthcoming DMA transfer from the controller 14. It is understood that the allocation of the available data buffers by the driver 32 need not necessarily occur after informing the controller 14 at 74, and in fact may occur at any suitable time in the flowchart 72 after the replacement data buffers become available.

With an embodiment of the invention, a reasonable percentage of inform writes are batched together. Choosing a suitable percentage to batch together can depend on several factors. Such factors that can influence the batch size include: protocol stack turn-around time, availability of replacement data buffers, the controller's 14 throughput speed and profile, the maximum number of data buffers that the controller 14 can queue at once, bus latency and arbitration time, throughput of the bus 12, and the size of the on-chip buffer 38. These factors are generally application or hardware specific, and those skilled in the art having the benefit of this disclosure can determine appropriate batch sizes that optimize their particular system's bus and data transfer efficiency.

In conclusion, an embodiment of the invention selectively informs the controller 14 when a plurality of data buffers are available to receive sets of data, such as frames. By batching inform writes to the controller 14 as a single message, rather than sending the inform writes individually after single data buffers become available, bus contention is reduced and bus efficiency is improved. An embodiment of the invention is useful in bus systems where data is sent in bursts. With a prior art method that uses 256 data buffers, for example, informing a controller of the availability of only one of the 256 data buffers needlessly delays or impedes the ability of the controller to continue writing to the other 255 data buffers in bursts. With an embodiment of the invention, however, such inform writes are batched so that the controller 14 is provided with less interruption to burst write to a group of data buffers among the 256 data buffers, for example.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while an embodiment has been described herein as having a constant batch size that is used during write operations, it is to be appreciated that in another embodiment, the batch size may be made variable or dynamic. Accordingly, the invention is not limited by any specific batch size.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   writing a plurality of sets of data to a corresponding plurality of data buffers;
   processing the sets of data written in the data buffers and making each data buffer available to receive an additional set of data subsequent to the processing of its respective written set of data; and
   informing of availability of data buffers among the plurality of data buffers as a single message, once a threshold number greater than two of the plurality of data buffers are available.

2. The method of claim 1, further comprising allocating the available data buffers and writing the additional sets of data to corresponding available data buffers.

3. The method of claim 1 wherein the sets of data comprise frames.

4. The method of claim 1, further comprising:
   excluding reference to at least one data buffer among the plurality of data buffers in the single message, if the at least one data buffer is unavailable; and
   if the at least one data buffer subsequently becomes available, including reference to the at least one data buffer in a subsequent single message to inform of availability of additional data buffers.

5. The method of claim 1 wherein writing the plurality of sets of data comprises direct memory access transferring the plurality of sets of data to the corresponding plurality of data buffers.

6. The method of claim 1, further comprising:
   inserting information into descriptors to point to the available data buffers; and
   providing the descriptors to a controller, as part of the informing of the availability of the data buffers, to allow the controller to identify the available data buffers.

7. The method of claim 1, further comprising:
   setting a batch size of available data buffers equal to the threshold number; and
   counting data buffers as they become available until the batch size is reached.

8. A method, comprising:
   waiting for availability of a threshold number greater than two of a plurality of data buffers; and
   if the threshold number of the plurality of data buffers becomes available, sending a single message to collectively inform of availability of data buffers among the plurality of data buffers.

9. The method of claim 8, further comprising:
   excluding reference to at least one data buffer among the plurality of data buffers in the single message, if the at least one data buffer is unavailable; and
   if the at least one data buffer subsequently becomes available, including reference to the at least one data buffer in a subsequent single message to collectively inform of availability of additional data buffers.

10. The method of claim 8, further comprising:
    writing frames to corresponding data buffers;
    processing each written frame and making each frame's respective data buffer available subsequent to the processing of that data buffer's frame; and
    writing new frames into the available data buffers subsequent to sending the single message that collectively informs of the availability of the data buffers.

11. The method of claim 8 wherein the data buffers become available subsequent to processing of data stored therein by a component.

12. A machine-readable medium having stored thereon instructions, which if executed by a processor, cause the processor to effect the following, comprising:
    monitor for availability of a threshold number greater than two of a plurality of data buffers; and
    if the threshold number of the plurality of data buffers becomes available, send a single message to collectively inform of availability of data buffers among the plurality of data buffers.

13. The machine-readable medium of claim 12 wherein the instructions further cause the processor to effect the following, comprising:
    exclude reference to at least one data buffer among the plurality of data buffers in the single message, if the at least one data buffer is unavailable; and
    if the at least one data buffer subsequently becomes available, include reference to the at least one data buffer in a subsequent single message to collectively inform of availability of additional data buffers.

14. The machine-readable medium of claim 12 wherein the instructions further cause the processor to effect the following, comprising:
    write frames to corresponding data buffers;
    process each written frame and making each frame's respective data buffer available subsequent to the processing of that data buffer's frame; and
    write a new frame into the available data buffers subsequent to sending the single message that collectively informs of the availability of the data buffers.

15. An apparatus, comprising:
    a controller to write data into a plurality of locations; and
    a driver for the controller to determine availability of a threshold number greater than two of the plurality of locations to receive data from the controller, and to send a single message to the controller to collectively inform the controller of the availability of locations among the plurality of locations in which to write data.

16. The apparatus of claim 15, further comprising a register in the controller to receive the single message from the driver.

17. The apparatus of claim 15, further comprising a buffer in the controller to hold data while the controller waits for the single message from the driver.

18. The apparatus of claim 15 wherein the driver is capable to insert information into a descriptor corresponding to each available location, the information indicative of the availability of the location, the controller being capable to process the descriptor to determine addresses of available locations.

19. The apparatus of claim 15 wherein the driver is capable to exclude reference to at least one location among the plurality of locations in the single message sent to the controller, if the at least one data buffer is unavailable, and if the at least one data buffer subsequently becomes available, to include reference to the at least one location in a subsequent single message sent to the controller to collectively inform the controller of availability of additional locations.

20. The apparatus of claim 15 wherein the controller is capable to write data into the plurality of locations with direct memory access transfers.

21. A system comprising:

a plurality of data buffers;

a controller communicatively coupled to the plurality of data buffers to write data into the plurality of data buffers; and a driver for the controller to determine availability of a threshold number greater than two of the plurality of data buffers to receive data from the controller, and to send a single message to the controller to collectively inform the controller of the availability of data buffers among the plurality of data buffers in which to write data.

22. The system of claim 21, further comprising a processor coupled to the controller to control operation of the driver.

23. The system of claim 21, further comprising a bus coupled between the data buffers and the controller to carry data from the controller to be written into the data buffers, and to carry the single message from the driver to the controller.

24. The system of claim 21 wherein the driver is capable to determine availability of the data buffers subsequent to processing of data stored therein by a component.

25. The system of claim 21 wherein the driver is capable to exclude reference to at least one data buffer among the plurality of data buffers in the single message sent to the controller, if the at least one data buffer is unavailable, and if the at least one data buffer subsequently becomes available, to include reference to the at least one data buffer in a subsequent single message sent to the controller to collectively inform the controller of availability of additional data buffers.

* * * * *